(12) United States Patent
Shen (10) Patent No.: US 12,284,673 B2
(45) Date of Patent: Apr. 22, 2025

(54) LISTEN BEFORE TALK LBT SUBBAND DIVISION METHOD, APPARATUS, DEVICE, AND MEDIUM

(71) Applicant: VIVO MOBILE COMMUNICATION CO., LTD., Guangdong (CN)

(72) Inventor: Xiaodong Shen, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 462 days.

(21) Appl. No.: 17/698,980

(22) Filed: Mar. 18, 2022

(65) Prior Publication Data

US 2022/0210832 A1 Jun. 30, 2022

Related U.S. Application Data

(63) Continuation of application No. PCT/CN2020/116903, filed on Sep. 22, 2020.

(30) Foreign Application Priority Data

Sep. 27, 2019 (CN) .......................... 201910927231.X (51) Int. Cl.
*H04W 74/08* (2024.01)
*H04W 72/04* (2023.01)
*H04W 72/0453* (2023.01)
*H04W 74/0808* (2024.01)

(52) U.S. Cl.
CPC ... *H04W 74/0808* (2013.01); *H04W 72/0453* (2013.01)

(58) Field of Classification Search
CPC ...................... H04W 74/0808; H04W 72/0453
See application file for complete search history.

(56) References Cited

U.S. PATENT DOCUMENTS

| 2017/0215170 | A1  | 7/2017  | Islam et al. |
| 2018/0302195 | A1* | 10/2018 | Kim ...................... H04L 1/1861 |
| 2018/0324604 | A1  | 11/2018 | Yang et al. |
| 2019/0110318 | A1  | 4/2019  | Zhang et al. |
| 2019/0230706 | A1  | 7/2019  | Li et al. |
| 2019/0394811 | A1* | 12/2019 | Yang ..................... H04W 74/08 |

(Continued)

FOREIGN PATENT DOCUMENTS

| CN | 106686603 A | 5/2017 |
| CN | 108605324 A | 9/2018 |

(Continued)

OTHER PUBLICATIONS

1st Chinese Office Action, English Translation.
(Continued)

*Primary Examiner* — Abdullahi E Salad
(74) *Attorney, Agent, or Firm* — BROOKS KUSHMAN P.C.

(57) ABSTRACT

A listen before talk LBT subband division method, apparatus, device, and medium are provided. The method includes: obtaining first information, where the first information includes information about frequency domain starting and ending positions of a target, and the target includes a carrier or a bandwidth part BWP; and dividing the target into LBT subbands based on the information about the frequency domain starting and ending positions.

17 Claims, 7 Drawing Sheets

(56) References Cited

U.S. PATENT DOCUMENTS

| | | | |
|---|---|---|---|
| 2020/0028740 A1* | 1/2020 | Kim | H04L 41/0895 |
| 2020/0100284 A1* | 3/2020 | Li | H04W 24/10 |
| 2021/0127422 A1* | 4/2021 | Jiang | H04L 5/0055 |
| 2021/0160919 A1* | 5/2021 | Wang | H04W 74/08 |
| 2021/0250142 A1* | 8/2021 | Wang | H04L 5/0053 |
| 2021/0250923 A1 | 8/2021 | Liu | |
| 2021/0288852 A1* | 9/2021 | Jia | H04W 72/23 |

FOREIGN PATENT DOCUMENTS

| | | |
|---|---|---|
| CN | 109565834 A | 4/2019 |
| CN | 110034830 A | 7/2019 |
| CN | 111263440 A | 6/2020 |
| WO | 2019108654 A1 | 6/2019 |

OTHER PUBLICATIONS

International Search Report and Written Opinion, English Translation.

CN10686603A, English Abstract and U.S. Equivalent U.S. Pub. No. 2018/0324604.

CN108605324A, English Abstract and U.S. Equivalent U.S. Pub. No. 2017/0215170.

CN109565834A, English Abstract and U.S. Equivalent U.S. Pub. No. 2021/0250923.

CN110034830A, English Abstract and Machine Translation.

CN111263440A, English Abstract and U.S. Equivalent U.S. Pub. No. 2021/0288852.

First Office Action for Japanaese Application No. 2022-519329, dated May 1, 2023, 3 Pages.

MediaTek Inc., "Wideband operation for NR-U." 3GPP TSG RAN WG1 #98, Prague, Czech, Aug. 2019, R1-1908389, 6 Pages.

First Office Action for Chinese Application No. 201910927231.X, dated Jan. 25, 2022, 7 Pages.

International Search Report and Written Opinion for Application No. PCT/CN2020/116903, dated Dec. 30, 2020, 10 Pages.

Samsung, "Uplink Signal and Channel Design for NR-U," 3GPP TSG RAN WG1 #96bis, Agenda item 7.2.2.1.3, Apr. 12, 2019, R1-1904405, Xi'an, China, 6 Pages.

Huawei et al., "UL Channels and Signals in NR Unlicensed Band," 3GPP TSG RAN WG1 #97, Agenda item 7.2.2.1.3, May 13-17, 2019, R1-1906043, Reno, NV, USA, 17 Pages.

Etri, "Wideband Operation for NR-U," 3GPP TSG RAN WG1 #98, Agenda item 7.2.2.2.5, Aug. 26-30, 2019, R1-1908809, Prague, Czech Republic, 7 Pages.

\* cited by examiner

LISTEN BEFORE TALK LBT SUBBAND DIVISION METHOD, APPARATUS, DEVICE, AND MEDIUM

CROSS-REFERENCE TO RELATED APPLICATIONS

This application is a continuation of International Application No. PCT/CN2020/116903 filed on Sep. 22, 2020, which claims priority to Chinese Patent Application No. 201910927231.X, filed on Sep. 27, 2019, the disclosures of which are hereby incorporated by reference in their entireties.

TECHNICAL FIELD

This disclosure relates to the field of mobile communications technologies, and in particular, to a listen before talk LBT subband division method, apparatus, device, and medium.

BACKGROUND

During transmission in an unlicensed band of new radio (NR), before information is transmitted, a terminal device or a network device needs to perform clear channel assessment (CCA) or extended clear channel assessment (eCCA) to monitor a channel, that is, to perform energy detection (ED). When measured energy is lower than a threshold, the channel is determined to be clear, and then transmission can be started. Such process is referred to as listen before talk (LBT).

For wideband carriers in unlicensed bands, CCA is performed on specified LBT subbands. Configuration, scheduling, or indication of many resources is performed at the granularity of LBT subband. Therefore, for unlicensed bands, how to divide LBT subbands is a problem to be urgently resolved.

SUMMARY

Embodiments of this disclosure provide a listen before talk LBT subband division method, apparatus, device, and medium.

According to one aspect, an embodiment of this disclosure provides an LBT subband division method, including:

obtaining first information, where the first information includes information about frequency domain starting and ending positions of a target, and the target includes a carrier or a bandwidth part (BWP); and dividing the target into LBT subbands based on the information about the frequency domain starting and ending positions.

According to another aspect, an embodiment of this disclosure provides an LBT subband division apparatus, including:

an obtaining module, configured to obtain first information, where the first information includes information about frequency domain starting and ending positions of a target, and the target includes a carrier or a BWP; and a division module, configured to divide the target into LBT subbands based on the information about the frequency domain starting and ending positions.

According to still another aspect, an embodiment of this disclosure provides an LBT subband division device, including a processor, a memory, and a computer program stored in the memory and capable of running on the processor, where when the computer program is executed by the processor, the LBT subband division method according to the embodiments of this disclosure is implemented.

According to yet another aspect, an embodiment of this disclosure provides a computer-readable storage medium. A computer program is stored in the computer-readable storage medium. When the computer program is executed by a processor, the LBT subband division method according to the embodiments of this disclosure is implemented.

BRIEF DESCRIPTION OF DRAWINGS

To describe the technical solutions in the embodiments of this disclosure more clearly, the following briefly introduces the accompanying drawings required for describing the embodiments of this disclosure. Persons of ordinary skill in the art may still derive other drawings from these accompanying drawings.

DETAILED DESCRIPTION

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure shall fall within the protection scope of this disclosure.

The embodiments of this disclosure provide an LBT subband division method, apparatus, device, and medium. The following first describes the LBT subband division method provided by the embodiments of this disclosure.

Figure 1:
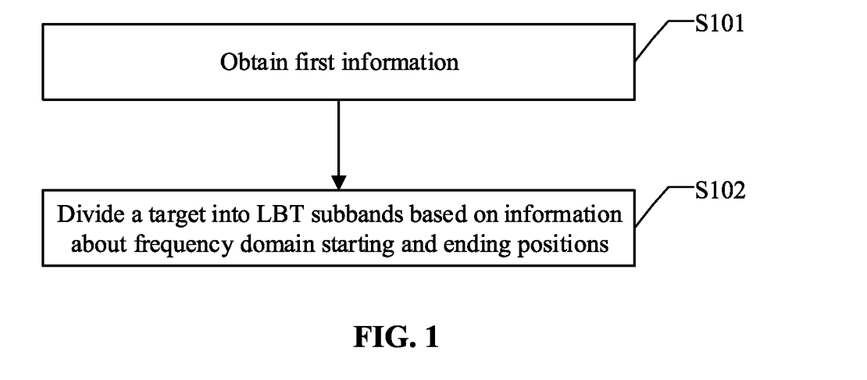
FIG. 1 is a schematic flowchart of an LBT subband division method according to an embodiment of this disclosure.

FIG. 1 is a schematic flowchart of an LBT subband division method according to an embodiment of this disclosure. The LBT subband division method may include the following steps.

S101: Obtain first information, where the first information includes information about frequency domain starting and ending positions of a target, and the target includes a carrier or a BWP. It can be understood that the information about the frequency domain starting and ending positions includes information about the frequency domain starting position and information about the frequency domain ending position.

S102: Divide the target into LBT subbands based on the information about the frequency domain starting and ending positions.

For a carrier, information about frequency domain starting and ending positions of the carrier may be obtained from a system information block (SIB) 1.

For a BWP before a radio resource control (RRC) message (such as a setup message, resume information, and a reestablishment message) is received, information about frequency domain starting and ending positions of the BWP is the same as information about frequency domain starting and ending positions of a control resource set (CORESET) #0. For a BWP after the RRC message is received, information about frequency domain starting and ending positions of the BWP is configured by using information in the SIB1. For a terminal device-specific BWP, a reference bandwidth range to which the BWP belongs can be obtained based on a subcarrier spacing (SCS) configuration of the BWP and a carrier information configuration in the SIB1, and then information about frequency domain starting and ending positions of the BWP is obtained from the reference bandwidth range based on a resource indicator value (RIV) indicated by location and bandwidth (locationAndBandwidth).

The LBT subband division method in this embodiment of this disclosure may be applied to a network-side device, and may also be applied to a terminal device. The network-side device in the embodiments of this disclosure may be a base station, and the base station may be a base station commonly used, or may be an evolved base station (evolved node base station, eNB), or may be a network-side device (such as a next-generation base station (gNB)) in the 5G system or a network-side device in a later evolved communications system. However, the terms used do not constitute any limitation on the protection scope of this disclosure. Examples of the terminal device include but are not limited to a mobile phone, a tablet computer, a laptop computer, a personal digital assistant, an in-vehicle terminal, a wearable device, a pedometer, and the like.

In an embodiment of this disclosure, the first information may further include: LBT channel planning information. Different LBT channel bandwidths may correspond to different LBT channel planning information. Different locations (such as countries or regions) may also correspond to different LBT channel planning information. For example, LBT channel planning information in China is using every 20 megahertz (MHz) from 5170 MHz in a frequency range of 5170 MHz to 5330 MHz as one LBT channel; and LBT channel planning information in the United States is using every 40 MHz from 5170 MHz in a frequency range of 5170 MHz to 5330 MHz as one LBT channel.

During LBT subband division for the target, the target can be divided into LBT subbands based on the information about the frequency domain starting and ending positions and the LBT channel planning information. In some embodiments, the target may be divided into L LBT subbands based on the information about the frequency domain starting and ending positions and the LBT channel planning information.

Figure 2:
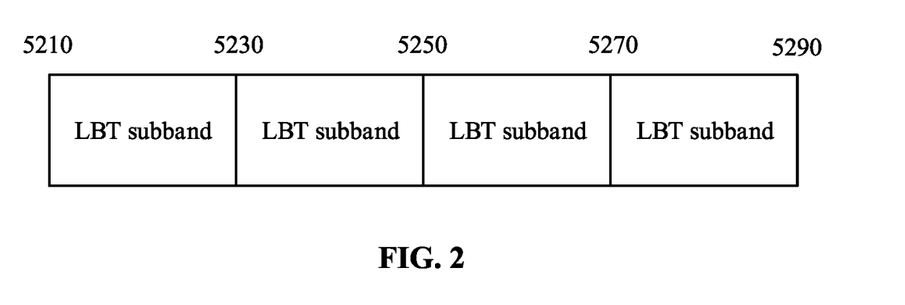
FIG. 2 is a schematic diagram of a first example of an LBT subband division result according to this disclosure.

For example, it is assumed that the LBT channel planning information is using every 20 MHz from 5170 MHz in the frequency range of 5170 MHz to 5330 MHz as one LBT channel. The frequency domain starting position of the target is 5210 MHz, and the frequency domain ending position of the target is 5290 MHz. The target can be divided into four LBT subbands. An LBT subband division result is shown in FIG. 2. FIG. 2 is a schematic diagram of a first example of an LBT subband division result according to this disclosure.

In an embodiment of this disclosure, the first information may further include an LBT subband division granularity. During LBT subband division for the target, the target can be divided into M LBT subbands from the frequency domain starting position of the target based on the LBT subband division granularity.

For example, it is assumed that the LBT subband division granularity is 40 MHz, the frequency domain starting position of the target is 5210 MHz, and the frequency domain ending position of the target is 5290 MHz.

Figure 3:
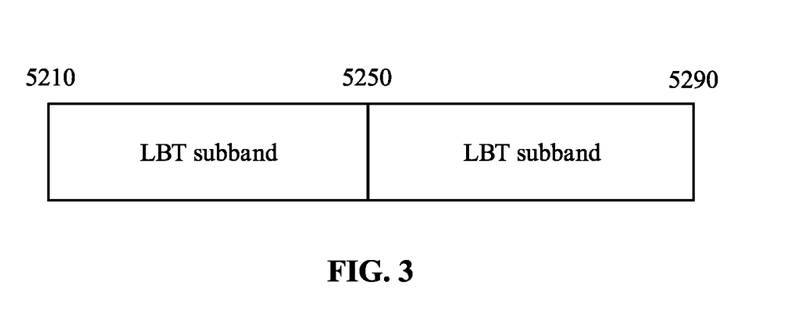
FIG. 3 is a schematic diagram of a second example of an LBT subband division result according to this disclosure.

Starting from the frequency domain starting position 5210 MHz of the target, every 40 MHz is grouped as one LBT subband. An LBT subband division result is shown in FIG. 3. FIG. 3 is a schematic diagram of a second example of an LBT subband division result according to this disclosure.

In an embodiment of this disclosure, the first information may further include an LBT subband division granularity and information about a division starting position. During LBT subband division for the target, a range from the frequency domain starting position of the target to the division starting position is grouped as one LBT subband, and the target is divided into N LBT subbands from the division starting position based on the LBT subband division granularity.

For example, it is assumed that the LBT subband division granularity is 20 MHz, the frequency domain starting position of the target is 5210 MHz, and the frequency domain ending position of the target is 5290 MHz. The division starting position is 5240 MHz.

Figure 4:
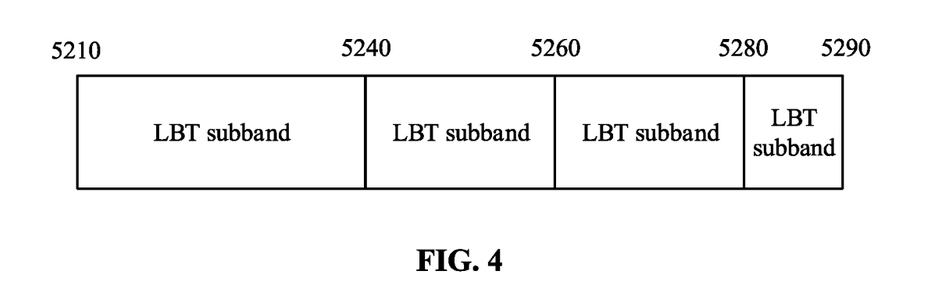
FIG. 4 is a schematic diagram of a third example of an LBT subband division result according to this disclosure.

A range from the frequency domain starting position 5210 MHz of the target to 5240 MHz is grouped as one LBT subband of the target. Starting from 5240 MHz, every 20 MHz is grouped as one LBT subband, that is, 5240 MHz to 5260 MHz are grouped as one LBT subband, 5260 MHz to 5280 MHz are grouped as one LBT subband, and 5280 MHz to 5290 MHz are grouped as one LBT subband. An LBT subband division result is shown in FIG. 4. FIG. 4 is a schematic diagram of a third example of an LBT subband division result according to this disclosure.

In an embodiment of this disclosure, the first information further includes: information about a frequency domain segmentation position. During LBT subband division for the target, the target can be divided into P LBT subbands from the frequency domain starting position of the target based on the frequency domain segmentation position.

Figure 5:
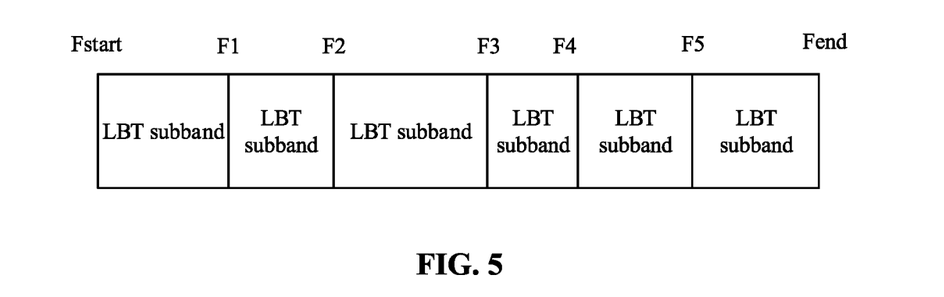
FIG. 5 is a schematic diagram of a fourth example of an LBT subband division result according to this disclosure.

For example, it is assumed that the frequency domain starting position of the target is Fstart, and the frequency domain ending position of the target is Fend. The information about the frequency domain segmentation position includes five frequency domain segmentation points, the five frequency domain segmentation points are F1, F2, F3, F4, and F5, and frequencies corresponding to the five frequency domain segmentation points increase sequentially. Then, the target is divided into six LBT subbands, and frequency ranges of the six LBT subbands are Fstart to F1, F1 to F2, F2 to F3, F3 to F4, F4 to F5, and F5 to Fend. An LBT subband division result is shown in FIG. 5. FIG. 5 is a schematic diagram of a fourth example of an LBT subband division result according to this disclosure.

In an embodiment of this disclosure, the first information may further include: information about a starting physical resource block (PRB) of each LBT subband and information about an ending PRB of each LBT subband. During LBT subband division for the target, the target can be divided into Q LBT subbands based on the information about the frequency domain starting and ending positions, the information about the starting PRB, and the information about the ending PRB.

PRB information may include a PRB index or a PRB offset.

In an embodiment of this disclosure, when the target is a carrier, the first information may further include: information about frequency domain starting and ending positions of a BWP.

During division of LBT subbands of a BWP, the frequency domain starting position of the BWP is determined to be located at a first position of the LBT subband of the carrier; the frequency domain ending position of the BWP is determined to be located at a second position of the LBT subband of the carrier; and the BWP is divided into R LBT subbands based on the first position and the second position.

Figure 6:
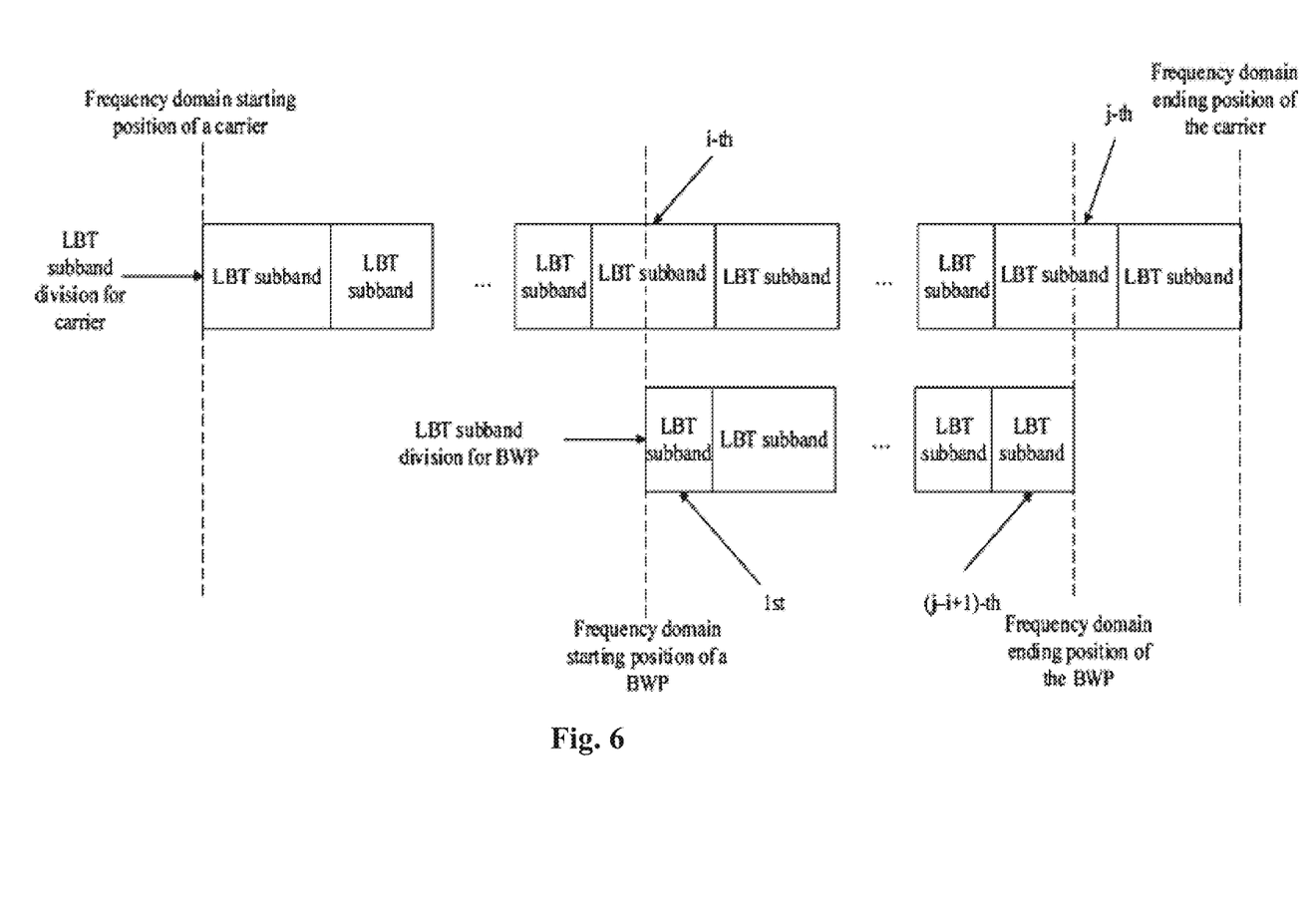
FIG. 6 is a schematic diagram of a fifth example of an LBT subband division result according to this disclosure.

For example, if it is determined that the frequency domain starting position of the BWP is located in the i-th LBT subband of the carrier, and it is determined that the frequency domain ending position of the BWP is located in the j-th LBT subband of the carrier, then the BWP is divided into j−i+1 LBT subbands. An LBT subband division result is shown in FIG. 6. FIG. 6 is a schematic diagram of a fifth example of an LBT subband division result according to this disclosure.

According to the LBT subband division method in this embodiment of this disclosure, the target can be divided into LBT subbands based on the information about the frequency domain starting and ending positions of the carrier or the information about the frequency domain starting and ending positions of the BWP.

In an embodiment of this disclosure, the LBT subbands may also be numbered based on frequency positions.

For example, frequency ranges of six LBT subbands are Fstart to F1, F1 to F2, F2 to F3, F3 to F4, F4 to F5, and F5 to Fend.

The LBT subband with the LBT subband frequency range from Fstart to F1 is numbered #0; the LBT subband with the LBT subband frequency range from F1 to F2 is numbered #1; the LBT subband with the LBT subband frequency range from F2 to F3 is numbered #2; the LBT subband with the LBT subband frequency range from F3 to F4 is numbered #3; the LBT subband with the LBT subband frequency range from F4 to F5 is numbered #4; and the LBT subband with the LBT subband frequency range from F5 to Fend is numbered #5.

In an embodiment of this disclosure, the network-side device may further configure second information, where the second information includes an LBT subband indication field, and the LBT subband indication field is used to indicate that an LBT subband in use is an LBT subband obtained through division in a predefined LBT subband division manner.

The predefined LBT subband division manner include: the dividing the target into L LBT subbands based on the information about the frequency domain starting and ending positions and the LBT channel planning information; the dividing the target into M LBT subbands from the frequency domain starting position of the target based on the LBT subband division granularity; the grouping a range from the frequency domain starting position of the target to the division starting position into one LBT subband, and dividing the target into N LBT subbands from the division starting position based on the LBT subband division granularity; the dividing the target into P LBT subbands from the frequency domain starting position of the target based on the frequency domain segmentation position; or the dividing the target into Q LBT subbands based on the information about the frequency domain starting and ending positions, the information about the starting PRB, and the information about the ending PRB.

The manner of dividing the target into LBT subbands is a target-based LBT subband division manner. It can be understood that the carrier-based LBT subband division manner is a manner of dividing a carrier into LBT subbands, and the BWP-based LBT subband division manner is a manner of dividing a BWP into LBT subbands.

For example, the LBT subband indication field indicates that an LBT subband is the 4th subband in the LBT subbands obtained through division in the carrier-based LBT subband division manner. There are six LBT subbands obtained through division in the carrier-based LBT subband division manner. The six LBT subbands are: the LBT subband numbered #0 in the frequency range from F start to F1, the LBT subband numbered #1 in the frequency range from F1 to F2; the LBT subband numbered #2 in the frequency range from F2 to F3; the LBT subband numbered #3 in the frequency range from F3 to F4; the LBT subband numbered #4 in the frequency range from F4 to F5; and the LBT subband numbered #5 in the frequency range from F5 to Fend. The LBT subband in use indicated by the LBT subband indication field is the LBT subband numbered #3 in the frequency range from F3 to F4.

In an embodiment of this disclosure, a size of the LBT subband indication field depends on the number of LBT subbands obtained through division.

In an embodiment of this disclosure, a bitmap or an LBT subband index may be used to indicate an LBT subband in use.

In an embodiment of this disclosure, the LBT subband indication field indicates that LBT subbands used for resource configuration, resource scheduling, and resource indication are LBT subbands that are all obtained through division in a carrier-based LBT subband division manner.

In an embodiment of this disclosure, the LBT subband indication field may indicate that LBT subbands used for different resource configuration, resource scheduling, and resource indication are LBT subbands obtained through division in different LBT subband division manners, where the different LBT subband division manners include: a carrier-based LBT subband division manner and a BWP-based LBT subband division manner.

In an embodiment of this disclosure, the LBT subband indication field may indicate that an LBT subband used for a frequency domain configuration of a BWP is an LBT subband obtained through division in the carrier-based LBT subband division manner, and an LBT subband used for a frequency domain configuration of a downlink resource or an uplink resource is an LBT subband obtained through division in the BWP-based LBT subband division manner.

In an embodiment of this disclosure, the LBT subband indication field may indicate that an LBT subband used in downlink control information (DCI) of a common search space is an LBT subband obtained through division in the carrier-based LBT subband division manner, and an LBT subband used in DCI of a search space of a terminal device is an LBT subband obtained through division in the BWP-based LBT subband division manner.

In an embodiment of this disclosure, the LBT subband indication field may indicate that an LBT subband used for fallback DCI is an LBT subband obtained through division in the carrier-based LBT subband division manner, and an LBT subband used for non-fallback DCI is an LBT subband obtained through division in the BWP-based LBT subband division manner.

In an embodiment of this disclosure, the LBT subband indication field may indicate that an LBT subband used for indicating idle frequency domain by a group common physical downlink control channel is an LBT subband obtained through division in the carrier-based LBT subband division manner, and an LBT subband used for indicating idle frequency domain by a specific physical downlink control channel of a terminal device is an LBT subband obtained through division in the BWP-based LBT subband division manner.

In an embodiment of this disclosure, the network-side device may send the second information to an upper layer or a terminal device. The upper layer or the terminal device uses an LBT subband according to the LBT subband in use that is indicated by the LBT subband indication field.

In an embodiment of this disclosure, when the LBT subband indication field indicates that the manner of dividing the LBT subbands used for the frequency domain configuration of the downlink resource or the uplink resource is the BWP-based LBT subband division manner, the LBT subband indication field may further indicate that the frequency domain configuration of the downlink resource or the uplink resource is an intersection of a frequency domain configuration indicated by an LBT subband in use and a frequency domain configuration indicated by another frequency domain indication.

Figure 7:
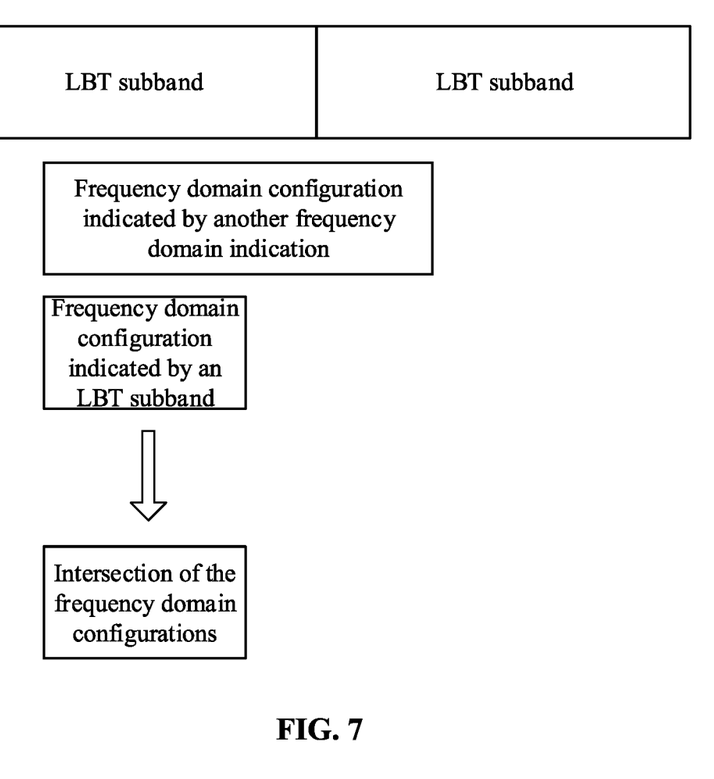
FIG. 7 is a schematic diagram of a first example of a frequency domain configuration according to this disclosure.

For example, when a frequency domain configuration of a control resource set (CORESET), a search space, a channel state information reference signal (CSI-RS), a phase-tracking reference signal (PT-RS), or the like spans a plurality of LBT subbands, the frequency domain configuration may be indicated as an intersection of a frequency domain configuration indicated by an LBT subband in use and a frequency domain configuration indicated by another frequency domain indication. As shown in FIG. 7, FIG. 7 is a schematic diagram of a first example of a frequency domain configuration according to this disclosure.

In an embodiment of this disclosure, when the LBT subband indication field indicates that the manner of dividing the LBT subbands used for the frequency domain configuration of the downlink resource or the uplink resource is the BWP-based LBT subband division manner, the LBT subband indication field may further indicate that the frequency domain configuration of the downlink resource or the uplink resource is a frequency domain configuration indicated by an LBT subband in use and obtained by duplicating a frequency domain configuration indicated by another frequency domain indication.

Figure 8:
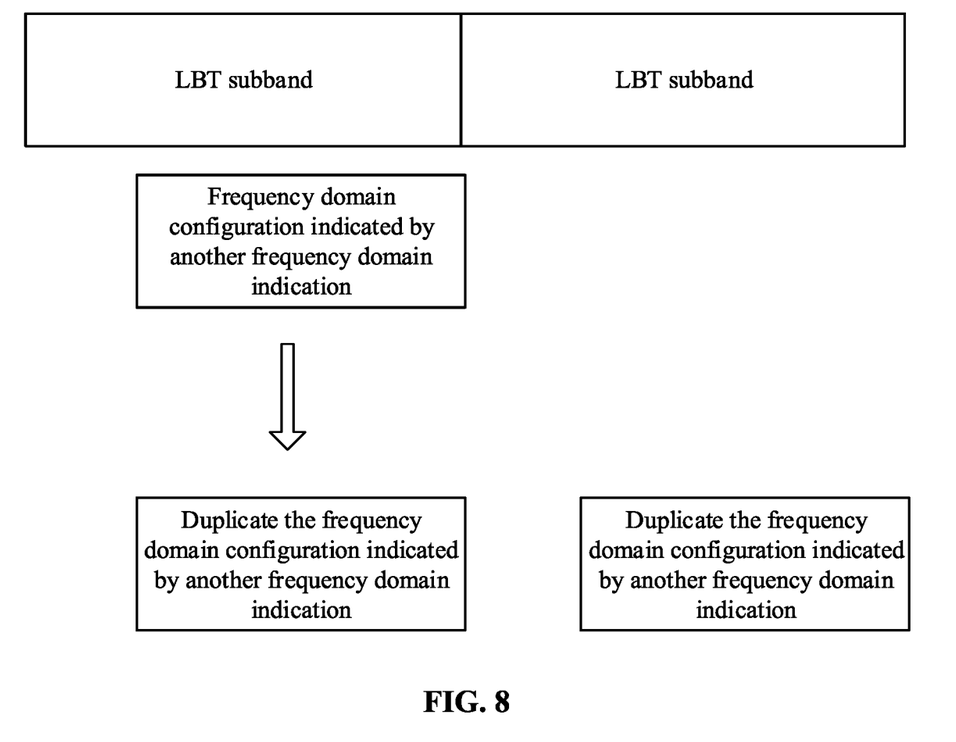
FIG. 8 is a schematic diagram of a second example of a frequency domain configuration according to this disclosure.

For example, when the frequency domain configuration of the CORESET, search space, CSI-RS, PT-RS, or the like is limited to one LBT subband, the frequency domain configuration may be indicated as a frequency domain configuration indicated by an LBT subband in use and obtained by duplicating a frequency domain configuration indicated by another frequency domain indication. As shown in FIG. 8, FIG. 8 is a schematic diagram of a second example of a frequency domain configuration according to this disclosure.

In an embodiment of this disclosure, when the LBT subband indication field indicates that the manner of dividing the LBT subbands used for the frequency domain configuration of the downlink resource or the uplink resource is the BWP-based LBT subband division manner, the LBT subband indication field may further indicate that the frequency domain configuration of the uplink resource is a frequency domain configuration that is interlaced on a frequency domain configuration indicated by an LBT subband in use.

Figure 9:
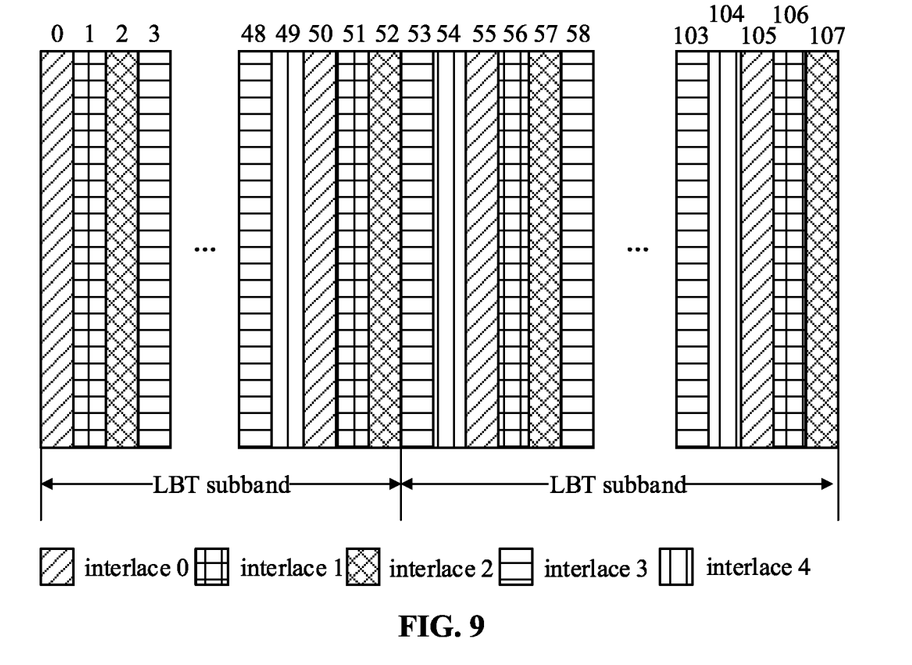
FIG. 9 is a schematic diagram of a third example of a frequency domain configuration according to this disclosure.

For example, the frequency domain configuration of the uplink resource includes an uplink interlace index and an LBT subband indication index of the BWP, and a physical resource block (PRB) represented by the uplink interlace index and falling within a frequency domain range indicated by the LBT subband is a PRB used for the uplink transmission resource. As shown in FIG. 9, FIG. 9 is a schematic diagram of a third example of a frequency domain configuration according to this disclosure. An interlace index for uplink resource allocation is 0, and an LBT subband indication index is 0. In this case, PRB indexes for uplink resource configuration are: PRB #0, PRB #5, PRB #10, . . . , and PRB #50.

Figure 10:
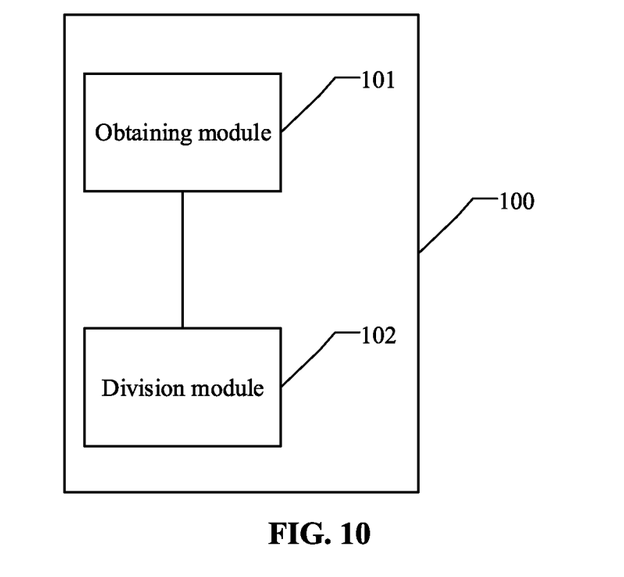
FIG. 10 is a schematic structural diagram of an LBT subband division apparatus according to an embodiment of this disclosure.

An embodiment of this disclosure further provides an LBT subband division apparatus. As shown in FIG. 10, FIG. 10 is a schematic structural diagram of an LBT subband division apparatus according to an embodiment of this disclosure. The LBT subband division apparatus 100 may include:

an obtaining module 101, configured to obtain first information, where the first information includes information about frequency domain starting and ending positions of a target, and the target includes a carrier or a BWP; and a division module 102, configured to divide the target into LBT subbands based on the information about the frequency domain starting and ending positions.

In an embodiment of this disclosure, the first information may further include: LBT channel planning information, where different LBT channel bandwidths and/or locations correspond to different LBT channel planning information. Correspondingly, the division module 102 may be specifically configured to divide the target into LBT subbands based on the information about the frequency domain starting and ending positions and the LBT channel planning information.

In an embodiment of this disclosure, the division module 102 may be specifically configured to:

divide the target into L LBT subbands based on the information about the frequency domain starting and ending positions and the LBT channel planning information.

In an embodiment of this disclosure, the first information may further include an LBT subband division granularity. Correspondingly, the division module 102 may be specifically configured to:

divide the target into M LBT subbands from the frequency domain starting position of the target based on the LBT subband division granularity.

In an embodiment of this disclosure, the first information may further include an LBT subband division granularity and information about a division starting position. Correspondingly, the division module 102 may be specifically configured to:

group a range from the frequency domain starting position of the target to the division starting position as one target LBT subband; and divide the target into N LBT subbands from the division starting position based on the LBT subband division granularity.

In an embodiment of this disclosure, the first information may further include information about a frequency domain segmentation position. Correspondingly, the division module 102 may be specifically configured to:

divide the target into P LBT subbands from the frequency domain starting position of the target based on the frequency domain segmentation position.

In an embodiment of this disclosure, the first information may further include: information about a starting physical resource block of each LBT subband and information about an ending physical resource block of each LBT subband. Correspondingly, the division module 102 may be specifically configured to:

divide the target into Q LBT subbands based on the information about the frequency domain starting and ending positions, the information about the starting physical resource block, and the information about the ending physical resource block.

In an embodiment of this disclosure, the target is a carrier, and the first information may further include: information about frequency domain starting and ending positions of a BWP. Correspondingly, the division module 102 may be specifically configured to:

determine that the frequency domain starting position of the BWP is located at a first position of the LBT subband of the carrier; determine that the frequency domain ending position of the BWP is located at a second position of the LBT subband of the carrier; and divide the BWP into R LBT subbands based on the first position and the second position.

In an embodiment of this disclosure, the LBT subband division apparatus 100 according to this embodiment of this disclosure may further include:

a numbering module, configured to number the LBT subbands based on frequency positions.

In an embodiment of this disclosure, the LBT subband division apparatus 100 according to this embodiment of this disclosure may further include:

a configuration module, configured to configure second information, where the second information includes an LBT subband indication field, and the LBT subband indication field is used to indicate that an LBT subband in use is an LBT subband obtained through division in a predefined LBT subband division manner.

In an embodiment of this disclosure, the LBT subband indication field indicates that LBT subbands used for resource configuration, resource scheduling, and resource indication are LBT subbands that are all obtained through division in a carrier-based LBT subband division manner.

In an embodiment of this disclosure, the LBT subband indication field indicates that LBT subbands used for different resource configuration, resource scheduling, and resource indication are LBT subbands obtained through division in different LBT subband division manners, where the different LBT subband division manners may include: a carrier-based LBT subband division manner and a BWP-based LBT subband division manner.

In an embodiment of this disclosure, the LBT subband indication field indicates that an LBT subband used for a frequency domain configuration of a BWP is an LBT subband obtained through division in the carrier-based LBT subband division manner, and an LBT subband used for a frequency domain configuration of a downlink resource or an uplink resource is an LBT subband obtained through division in the BWP-based LBT subband division manner.

In an embodiment of this disclosure, the LBT subband indication field may be further used to:

indicate that the frequency domain configuration of the downlink resource or the uplink resource is an intersection of a frequency domain configuration indicated by an LBT subband in use and a frequency domain configuration indicated by another frequency domain indication.

In an embodiment of this disclosure, the LBT subband indication field may be further used to:

indicate that the frequency domain configuration of the downlink resource or the uplink resource is a frequency domain configuration indicated by an LBT subband in use and obtained by duplicating a frequency domain configuration indicated by another frequency domain indication.

In an embodiment of this disclosure, the LBT subband indication field may be further used to:

indicate that the frequency domain configuration of the uplink resource is a frequency domain configuration that is interlaced on a frequency domain configuration indicated by an LBT subband in use.

In an embodiment of this disclosure, the LBT subband indication field indicates that an LBT subband used in downlink control information DCI of a common search space is an LBT subband obtained through division in the carrier-based LBT subband division manner, and an LBT subband used in DCI of a search space of a terminal device is an LBT subband obtained through division in the BWP-based LBT subband division manner.

In an embodiment of this disclosure, the LBT subband indication field indicates that an LBT subband used for fallback DCI is an LBT subband obtained through division in the carrier-based LBT subband division manner, and an LBT subband used for non-fallback DCI is an LBT subband obtained through division in the BWP-based LBT subband division manner.

In an embodiment of this disclosure, the LBT subband indication field indicates that an LBT subband used for indicating idle frequency domain by a group common physical downlink control channel is an LBT subband obtained through division in the carrier-based LBT subband division manner, and an LBT subband used for indicating idle frequency domain by a specific physical downlink control channel of a terminal device is an LBT subband obtained through division in the BWP-based LBT subband division manner.

An embodiment of this disclosure further provides an LBT subband division device, where the LBT subband division device may be a network-side device or a terminal device.

Figure 11:
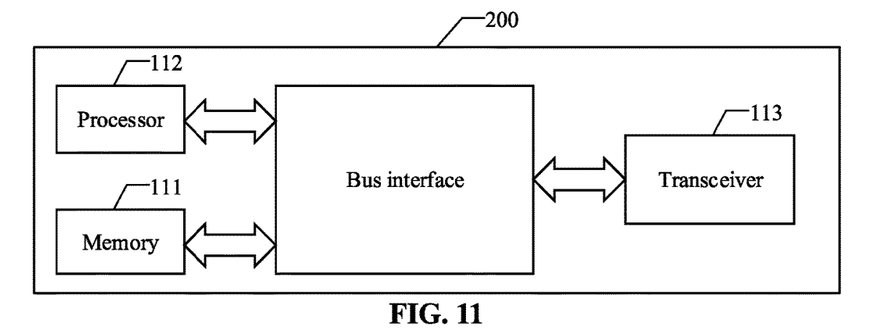
FIG. 11 is a schematic diagram of a hardware structure of an example of a network-side device according to this disclosure.

FIG. 11 is a schematic diagram of a hardware structure of an example of a network-side device according to this disclosure. The network-side device 200 includes: a memory 111, a processor 112, a transceiver 113, and a computer program stored on the memory 111 and capable of running on the processor 112.

The processor 112 may be configured to: obtain first information, and divide a target into LBT subbands based on information about frequency domain starting and ending positions of the target that are included in the first information, where the target includes a carrier or a BWP.

In an embodiment of this disclosure, the processor 112 may be further configured to: configure second information, where the second information includes an LBT subband indication field, and the LBT subband indication field is used to indicate that an LBT subband in use is an LBT subband obtained through division in a predefined LBT subband division manner.

The transceiver 113 may be configured to send the second information to an upper layer or a terminal device.

In FIG. 11, a bus architecture may include any quantity of interconnected buses and bridges, and specifically connects together circuits that are of one or more processors represented by the processor 112 and of a memory represented by the memory 111. The bus architecture may further interconnect various other circuits such as a peripheral device, a voltage regulator, and a power management circuit. These are all well known in the art, and therefore are not further described in this specification. The bus interface provides an interface. The transceiver 113 may be a plurality of components, that is, the transceiver 113 includes a transmitter and a receiver, and provides a unit for communicating with various other apparatuses on a transmission medium, for data reception and transmission under the control of the processor 112. The processor 112 is responsible for management of the bus architecture and general processing, and the memory 111 is capable of storing data that is used by the processor 112 during operation.

Figure 12:
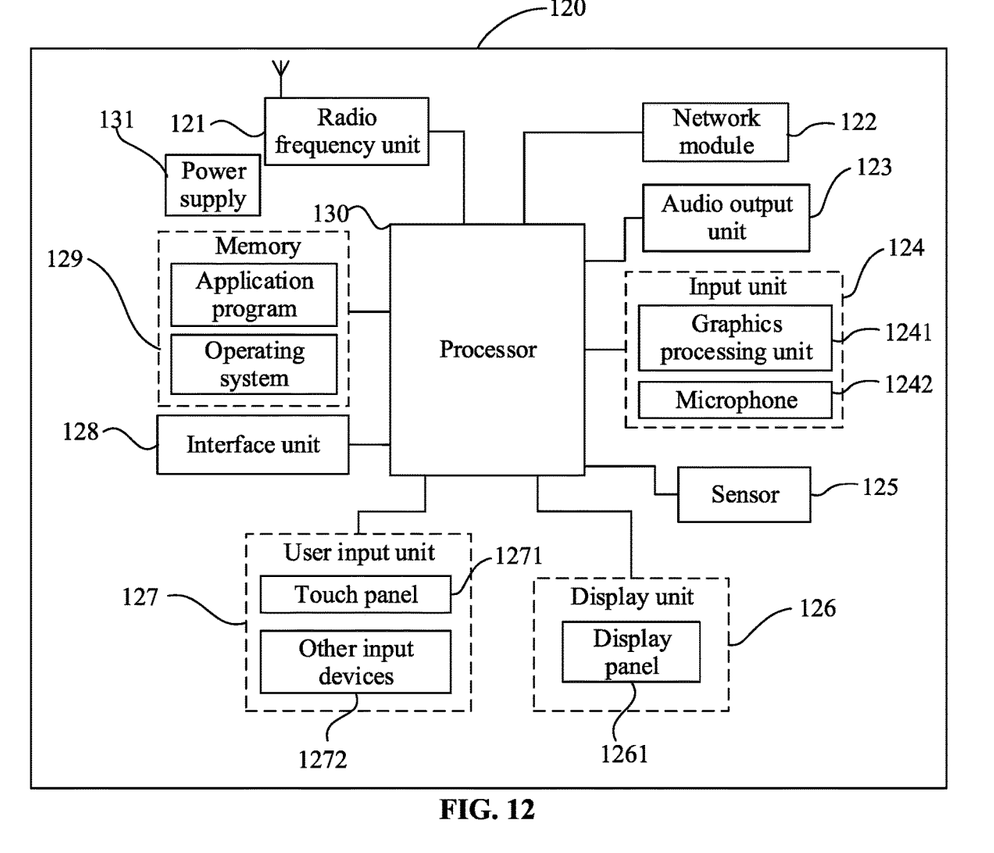
FIG. 12 is a schematic diagram of a hardware structure of an example of a terminal device according to this disclosure.

Optionally, an embodiment of this disclosure further provides a network-side device, including a processor 112, a memory 111, and a computer program stored in the memory 111 and capable of running on the processor 112. When the computer program is executed by the processor 112, the processes of the foregoing LBT subband division method embodiment can be implemented, with the same technical effects achieved. To avoid repetition, details are not described herein again. FIG. 12 is a schematic diagram of a hardware structure of an example of a terminal device according to this disclosure. The terminal device 120 includes but is not limited to components such as a radio frequency unit 121, a network module 122, an audio output unit 123, an input unit 124, a sensor 125, a display unit 126, a user input unit 127, an interface unit 128, a memory 129, a processor 130, and a power supply 131. A person skilled in the art can understand that the structure of the terminal device shown in FIG. 12 does not constitute any limitation on the terminal device. The terminal device may include more or fewer components than those shown in the figure, or a combination of some components, or the components disposed differently. In this embodiment of this disclosure, the terminal device includes but is not limited to a mobile phone, a tablet computer, a laptop computer, a personal digital assistant, an in-vehicle terminal, a wearable device, a pedometer, and the like.

The radio frequency unit 121 is configured to receive second information sent by a network-side device, where the second information includes an LBT subband indication field, and the LBT subband indication field is used to indicate that an LBT subband in use is an LBT subband obtained through division in a predefined LBT subband division manner.

The processor 130 may be configured to obtain first information based on an LBT subband indicated by the LBT subband indication field; divide LBT subbands based on frequency domain starting and ending positions included in the first information; and use the indicated LBT subband.

In this embodiment of this disclosure, the target can be divided into LBT subbands.

It should be understood that in this embodiment of this disclosure, the radio frequency unit 121 may be configured to: receive and transmit signals in an information receiving/sending process or a call process; and in some embodiments, after receiving downlink data from a base station, transmit the downlink information to the processor 130 for processing, and in addition, transmit uplink data to the base station. Generally, the radio frequency unit 121 includes but is not limited to an antenna, at least one amplifier, a transceiver, a coupler, a low noise amplifier, a duplexer, and the like. In addition, the radio frequency unit 121 may further communicate with a network and another device through a wireless communications system.

The terminal device provides a user with wireless broadband internet access through the network module 122, for example, helping the user to transmit and receive e-mails, browse web pages, and access streaming media.

The audio output unit 123 may convert audio data received by the radio frequency unit 121 or the network module 122 or stored in the memory 129 into an audio signal, and output the audio signal as a sound. Furthermore, the audio output unit 123 may also provide audio output (for example, a call signal received sound or a message received sound) related to a specific function performed by the terminal device 120. The audio output unit 123 includes a speaker, a buzzer, a receiver, and the like.

The input unit 124 is configured to receive an audio or video signal. The input unit 124 may include a graphics processing unit (GPU) 1241 and a microphone 1242. The graphics processing unit 1241 processes image data of a still picture or video obtained by an image capture apparatus (such as a camera) in a video capture mode or an image capture mode. A processed image frame may be displayed on the display unit 126. An image frame processed by the graphics processing unit 1241 may be stored in the memory 129 (or another storage medium) or transmitted by the radio frequency unit 121 or the network module 122. The microphone 1242 can receive a sound and can process the sound into audio data. The processed audio data may be converted in a telephone call mode into a format that can be transmitted by the radio frequency unit 121 to a mobile communications base station, for outputting.

The terminal device 120 may further include at least one sensor 125, for example, an optical sensor, a motion sensor, and other sensors. Specifically, the optical sensor may include an ambient light sensor and a proximity sensor. The ambient light sensor may adjust luminance of the display panel 1261 based on brightness of ambient light, and the proximity sensor may turn off the display panel 1261 and/or backlight when the terminal device 120 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal device, functions related to vibration recognition (such as pedometer and tapping), and the like. The sensor 125 may also include a fingerprint sensor, a pressure sensor, an iris sensor, a molecular sensor, a gyroscope, a barometer, a hygrometer, a thermometer, an infrared sensor, and the like. Details are not described herein.

The display unit 126 is configured to display information input by the user or information provided to the user. The display unit 126 may include a display panel 1261, and the display panel 1261 may be configured in a form of a liquid crystal display (LCD), an organic light-emitting diode (OLED), or the like.

The user input unit 127 may be configured to receive input digit or character information and generate key signal input related to user setting and function control of the terminal device. Specifically, the user input unit 127 may include a touch panel 1271 and other input devices 1272. The touch panel 1271, also referred to as a touchscreen, may capture a touch operation performed by the user on or near the touch panel (for example, an operation performed by the user on the touch panel 1271 or near the touch panel 1271 by using any appropriate object or accessory such as a finger or a stylus). The touch panel 1271 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, transmits the point coordinates to the processor 130, and receives and executes a command transmitted by the processor 130. In addition, the touch panel 1271 may be implemented in a plurality of forms, for example, a resistive, capacitive, infrared, or surface acoustic wave touch panel. The user input unit 127 may further include the other input devices 1272 in addition to the touch panel 1271. Specifically, the other input devices 1272 may include but are not limited to a physical keyboard, a function key (such as a volume control key or a power on/off key), a trackball, a mouse, a joystick, and the like. Details are not described herein.

Further, the touch panel 1271 may cover the display panel 1261. When detecting a touch operation on or near the touch panel 1271, the touch panel 1271 transmits the touch operation to the processor 130 to determine a type of a touch event. Then, the processor 130 provides a corresponding visual output on the display panel 1261 based on the type of the touch event. Although in FIG. 12, the touch panel 1271 and the display panel 1261 act as two independent parts to implement input and output functions of the terminal device, in some embodiments, the touch panel 1271 and the display panel 1261 may be integrated to implement the input and output functions of the terminal device. This is not specifically limited herein.

The interface unit 128 is an interface between an external apparatus and the terminal device 120. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 128 may be configured to receive an input (for example, data information or power) from an external apparatus and transmit the received input to one or more elements within the terminal device 120, or may be configured to transmit data between the terminal device 120 and the external apparatus.

The memory 129 may be configured to store software programs and various data. The memory 129 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 129 may include a high-speed random access memory, and may further include a non-volatile memory such as a disk storage device, a flash memory device, or another volatile solid-state storage device.

The processor 130 is a control center of the terminal device, uses various interfaces and lines to connect parts of the entire terminal device, and executes various functions and processing data of the terminal device by running or executing software programs and/or modules stored in the memory 129 and invoking data stored in the memory 129, so as to perform overall monitoring on the terminal device. The processor 130 may include one or more processing units. Optionally, the processor 130 may integrate an application processor and a modem processor. The application processor mainly processes the operating system, a user interface, an application program, and the like. The modem processor mainly processes wireless communication. It can be understood that the modem processor may alternatively be not integrated in the processor 130.

The terminal device 120 may further include a power supply 131 (such as a battery) that supplies power to components. Optionally, the power supply 131 may be logically connected to the processor 130 through a power management system. In this way, functions such as charge management, discharge management, and power consumption management are implemented by using the power management system.

In addition, the terminal device 120 includes some functional modules that are not shown. Details are not described herein.

Optionally, an embodiment of this disclosure further provides a terminal device, including a processor 130, a memory 129, and a computer program stored in the memory 129 and capable of running on the processor 130. When the computer program is executed by the processor 130, the processes of the foregoing LBT subband division method embodiment can be implemented, with the same technical effects achieved. To avoid repetition, details are not described herein again.

An embodiment of this disclosure further provides a computer-readable storage medium, where a computer program instruction is stored in the computer-readable storage medium. When the computer program instruction is executed by a processor, the processes of the foregoing LBT subband division method embodiments are implemented, with the same technical effects achieved. To avoid repetition, details are not described herein again. The computer-readable storage medium is, for example, a non-transitory computer-readable storage medium, such as a read-only memory (ROM), a random access memory (RAM), a magnetic disk, or an optical disc.

The foregoing describes aspects of this disclosure with reference to the flowcharts and/or block diagrams of the method, the apparatus (system), and the computer program product according to the embodiments of this disclosure. It should be further noted that each block in the block diagrams and/or the flowcharts and a combination of the blocks in the block diagrams and/or the flowcharts may be implemented by using the computer program instructions. These computer program instructions may be provided for a general-purpose computer, a dedicated computer, or a processor of any other programmable data processing apparatus to generate a machine, so that the instructions executed by a computer or a processor of any other programmable data processing apparatuses enable implementation of a specific function/action in one or more blocks in the flowcharts and/or block diagrams. Such processor may be, but is not limited to, a general-purpose processor, a dedicated processor, a special application processor, or a field programmable logic circuit. It should be further understood that each block in the block diagrams and/or the flowcharts and a combination of the blocks in the block diagrams and/or the flowcharts may be implemented by dedicated hardware for executing a specified function or action or may be implemented by a combination of dedicated hardware and computer instructions.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present invention.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A listen before talk (LBT) subband division method, wherein the method comprises:
    obtaining first information, wherein the first information comprises information about frequency domain starting and ending positions of a target, and the target comprises a carrier or a bandwidth part (BWP); and
    dividing the target into LBT subbands based on the information about the frequency domain starting and ending positions;
    wherein the target is a carrier, and the first information further comprises: information about frequency domain starting and ending positions of a BWP; and
    the method further comprises:
    determining that the frequency domain starting position of the BWP is located at a first position of the LBT subband of the carrier;
    determining that the frequency domain ending position of the BWP is located at a second position of the LBT subband of the carrier; and
    dividing the BWP into R LBT subbands based on the first position and the second position.

2. The method according to claim 1, wherein the first information further comprises LBT channel planning information, and different LBT channel bandwidths and/or locations correspond to different LBT channel planning information; and
    the dividing the target into LBT subbands based on the information about the frequency domain starting and ending positions comprises:
    dividing the target into LBT subbands based on the information about the frequency domain starting and ending positions and the LBT channel planning information.

3. The method according to claim 2, wherein the dividing the target into LBT subbands based on the information about the frequency domain starting and ending positions and the LBT channel planning information comprises:
    dividing the target into L LBT subbands based on the information about the frequency domain starting and ending positions and the LBT channel planning information.

4. The method according to claim 1, wherein the first information further comprises: information about a frequency domain segmentation position; and
    the dividing the target into LBT subbands based on the information about the frequency domain starting and ending positions comprises:
    dividing the target into P LBT subbands from the frequency domain starting position of the target based on the frequency domain segmentation position.

5. The method according to claim 1, wherein the method further comprises:
    numbering the LBT subbands based on frequency positions.

6. The method according to claim 1, wherein the method further comprises:
    configuring second information, wherein the second information comprises an LBT subband indication field, and the LBT subband indication field is used to indicate that an LBT subband in use is an LBT subband obtained through division in a predefined LBT subband division manner.

7. The method according to claim 6, wherein the LBT subband indication field indicates that LBT subbands used for resource configuration, resource scheduling, and resource indication are LBT subbands that are all obtained through division in a carrier-based LBT subband division manner.

8. A listen before talk (LBT) subband division device, wherein the device comprises a processor, a memory, and a computer program stored in the memory and capable of running on the processor, and the computer program, when executed by the processor of the device, causes the device to implement:
    obtaining first information, wherein the first information comprises information about frequency domain starting and ending positions of a target, and the target comprises a carrier or a bandwidth part (BWP); and
    dividing the target into LBT subbands based on the information about the frequency domain starting and ending positions;
    wherein the target is a carrier, and the first information further comprises: information about frequency domain starting and ending positions of a BWP; and
    the computer program, when executed by the processor of the device, causes the device to further implement:
    determining that the frequency domain starting position of the BWP is located at a first position of the LBT subband of the carrier;
    determining that the frequency domain ending position of the BWP is located at a second position of the LBT subband of the carrier; and dividing the BWP into R LBT subbands based on the first position and the second position.

9. The device according to claim 8, wherein the first information further comprises LBT channel planning information, and different LBT channel bandwidths and/or locations correspond to different LBT channel planning information; and the computer program, when executed by the processor of the device, causes the device to further implement:

dividing the target into LBT subbands based on the information about the frequency domain starting and ending positions and the LBT channel planning information.

10. The device according to claim 9, wherein the computer program, when executed by the processor of the device, causes the device to further implement:

dividing the target into L LBT subbands based on the information about the frequency domain starting and ending positions and the LBT channel planning information.

11. The device according to claim 8, wherein the first information further comprises: information about a frequency domain segmentation position; and the computer program, when executed by the processor of the device, causes the device to further implement:

dividing the target into P LBT subbands from the frequency domain starting position of the target based on the frequency domain segmentation position.

12. The device according to claim 8, wherein the computer program, when executed by the processor of the device, causes the device to further implement:

numbering the LBT subbands based on frequency positions.

13. The device according to claim 8, wherein the computer program, when executed by the processor of the device, causes the device to further implement:

configuring second information, wherein the second information comprises an LBT subband indication field, and the LBT subband indication field is used to indicate that an LBT subband in use is an LBT subband obtained through division in a predefined LBT subband division manner.

14. The device according to claim 13, wherein the LBT subband indication field indicates that LBT subbands used for resource configuration, resource scheduling, and resource indication are LBT subbands that are all obtained through division in a carrier-based LBT subband division manner.

15. A non-transitory computer-readable storage medium, wherein a computer program is stored in the non-transitory computer-readable storage medium, and the computer program is executed by a processor to implement:

obtaining first information, wherein the first information comprises information about frequency domain starting and ending positions of a target, and the target comprises a carrier or a bandwidth part (BWP); and dividing the target into LBT subbands based on the information about the frequency domain starting and ending positions;

wherein the target is a carrier, and the first information further comprises: information about frequency domain starting and ending positions of a BWP; and the computer program is executed by the processor to further implement:

determining that the frequency domain starting position of the BWP is located at a first position of the LBT subband of the carrier;

determining that the frequency domain ending position of the BWP is located at a second position of the LBT subband of the carrier; and dividing the BWP into R LBT subbands based on the first position and the second position.

16. The non-transitory computer-readable storage medium according to claim 15, wherein the first information further comprises: information about a frequency domain segmentation position; and the computer program is executed by the processor to further implement:

dividing the target into P LBT subbands from the frequency domain starting position of the target based on the frequency domain segmentation position.

17. The non-transitory computer-readable storage medium according to claim 15, wherein the computer program is executed by the processor to further implement:

numbering the LBT subbands based on frequency positions.

* * * * *